United States Patent
Stöckler

(10) Patent No.: US 7,229,081 B2
(45) Date of Patent: Jun. 12, 2007

(54) TRANSPORTER FOR A FOLDABLE TENT

(75) Inventor: Heinz Stöckler, Rüti (CH)

(73) Assignee: Patea GmbH, Zug (CH)

( * ) Notice: Subject to any disclaimer, the term of this patent is extended or adjusted under 35 U.S.C. 154(b) by 4 days.

(21) Appl. No.: 10/729,709

(22) Filed: Dec. 5, 2003

(65) Prior Publication Data
US 2004/0130110 A1   Jul. 8, 2004

(30) Foreign Application Priority Data
Dec. 5, 2002   (CH) .................................. 2062/02

(51) Int. Cl.
*B62B 1/12* (2006.01)
(52) U.S. Cl. ............................... 280/47.26; 280/47.24; 280/79.2
(58) Field of Classification Search ........... 280/47.131, 280/47.23, 47.24, 47.26, 47.27, 63, 79.11, 280/79.2, 79.7
See application file for complete search history.

(56) References Cited

U.S. PATENT DOCUMENTS

| 2,613,952 | A | * | 10/1952 | Lannon .................... 280/47.31 |
| 2,919,138 | A | * | 12/1959 | Brower et al. ................. 280/35 |
| 3,761,107 | A | * | 9/1973 | Docherty et al. ............ 280/659 |
| 4,050,708 | A | * | 9/1977 | Samardzija et al. ..... 280/47.26 |
| 5,265,894 | A | * | 11/1993 | Dunn ....................... 280/47.26 |
| 5,318,316 | A | * | 6/1994 | Shurtleff .................... 280/79.7 |
| 5,515,897 | A | * | 5/1996 | Fehan ......................... 150/159 |
| 5,632,496 | A | * | 5/1997 | Nelson ........................ 280/30 |
| 5,871,220 | A | * | 2/1999 | Lombard .................... 280/79.7 |
| 5,879,022 | A | * | 3/1999 | Winton ........................ 280/655 |
| 6,039,243 | A | * | 3/2000 | Lickton .................. 229/117.01 |
| 6,234,499 | B1 | * | 5/2001 | Irwin et al. ................... 280/63 |
| 6,254,112 | B1 | * | 7/2001 | Clegg ....................... 280/47.19 |
| 6,279,926 | B1 | * | 8/2001 | Taube et al. .................. 280/37 |
| 6,308,969 | B1 | * | 10/2001 | Young ........................ 280/79.7 |
| 6,357,063 | B1 | * | 3/2002 | Selby ........................ 5/81.1 R |
| 6,460,867 | B2 | * | 10/2002 | Sciulli ..................... 280/47.26 |
| 6,513,816 | B1 | * | 2/2003 | Kijima .................... 280/47.26 |
| 6,561,527 | B2 | * | 5/2003 | Spadino ................... 280/47.26 |
| 6,598,889 | B1 | * | 7/2003 | Su .......................... 280/47.26 |
| 6,808,186 | B1 | * | 10/2004 | Su .......................... 280/47.26 |
| 2003/0025303 | A1 | * | 2/2003 | Perelli et al. ............... 280/651 |

FOREIGN PATENT DOCUMENTS

EP   0 514 574 A1   11/1992

* cited by examiner

*Primary Examiner*—Jeff Restifo
(74) *Attorney, Agent, or Firm*—Victor N. King; Speckman Law Group PLLC

(57) ABSTRACT

A transporter for foldable tents is provided. The transporter comprises a case and a transport device for folded-up tents. The case is connected to an L-profile. The L-profile comprises a vertical plate and a horizontal plate. The horizontal plate engages below the tent while the vertical plate is releasably connected to the case. The tent is rigidly held together by way of a strip which extends around the tent in a horizontal plane. Generally, two wheels are used for the transport. The wheels are provided at two sides of the transporter. The wheels may be kept in a chamber near the very top of the case. The packed tent is pulled or pushed in a slanted position. The transporter allows the foldable tent to be transported and stored easily. Also, the erection and packing of the tent may be accomplished by only a single person.

7 Claims, 5 Drawing Sheets

TRANSPORTER FOR A FOLDABLE TENT

CLAIM FOR FOREIGN PRIORITY UNDER 37 U.S.C. § 119

This application claims foreign priority to Swiss Patent Application No. 2062/02, filed Dec. 5, 2002.

FIELD OF INVENTION

The present invention relates to a transport device and particularly to a device for transporting a foldable tent.

BACKGROUND OF THE INVENTION

A type of foldable tent is described in EP-A-0'514'574. This type of foldable tent may be used for a range of applications. The foldable tents may be used as party tents for gardens, market tents for protecting goods from the sun and the rain, or exhibition tents for accommodating goods and advertising material.

Such tents are mostly stored in a long carrying bag and carried to a set-up location. Depending on the size of the tent and the distance to be covered, the carrying of such tents may be very strenuous. Since the weight of such tents varies from 25 to 50 kilograms, carrying such a tent in a carrying bag, for example, to an exhibition hall located some distance away from a parking area may be extremely strenuous. The weight of the tents is especially a burdensome to persons with back ailments.

Such tents are also useful for occasions with many guests, such as a wedding in a garden. For such an occasion, many tents may need to be transported from one location to the other and it is often very strenuous to carry the tents from a delivery vehicle to the set-up location in a carrying bag.

To set up a tent stored in a carrying bag, the zipper or the VELCRO strip must first be actuated before removing the tent from the bag, and only after then may the tent be erected. Also, the tent needs to be turned by 180° so that both ends of the tent may be removed from the carrying bag one after the other. Since the tent is relatively heavy and lengthy (1.50 m), this turning procedure is quite strenuous.

It is therefore desirable to provide a transporter for a foldable tent that may be easily assembled and disassembled, and that allows the tent to be erected by only one person.

SUMMARY OF THE INVENTION

The present invention provides a transporter equipped with a transport device and a case releasably fastenable to a foldable tent. The transport device and the case may be removed from one tent by one person and may be quickly assembled onto another tent.

The case of the transporter encloses the foldable tent and the case may be closed by way of a zipper or a VELCRO strip. The case is cushioned and may be used to transport the tent, as well as protecting the tent from dust during storage. The transporter is suitable for transporting tents outdoors, e.g. over a field, as well as indoors, e.g. in a hall with either a carpeted or concrete floor surface.

The transport device of the transporter is provided with at least two wheels. The wheels may be removed during storage and kept in a chamber near the top of the case. The chamber may also be closed by way of a zipper or a VELCRO strip.

In one embodiment of the transporter, the transport device is provided with only two wheels whereby the foldable tent may be pushed or pulled in a slanted position, similar to a shopping trolley or traveler's suitcase.

The wheels are preferably larger than the wheels of a traveling suitcase so that the tent with the case may not only be pushed or pulled on a street with tarmac or a concrete floor, but also off-road, e.g. in the garden or over fields and lawns.

BRIEF DESCRIPTION OF THE DRAWINGS

Preferred embodiments of the present invention are described in detail below and illustrated in the drawings, in which.

DETAILED DESCRIPTION OF THE INVENTION

Figure 1:
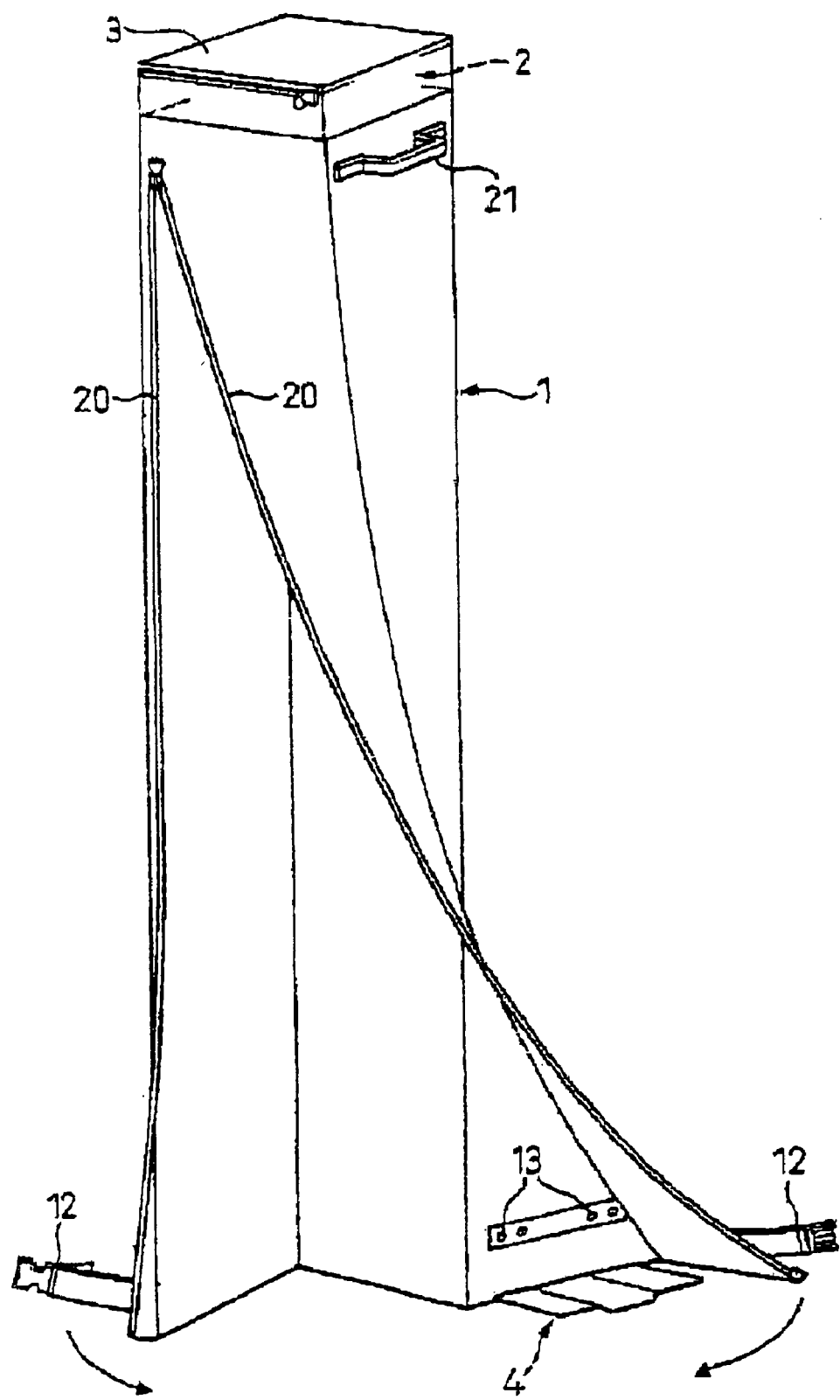
FIG. 1 shows a perspective view of the case of the transporter of the present invention, with the zipper opened and the wheels not shown.
Figure 3:
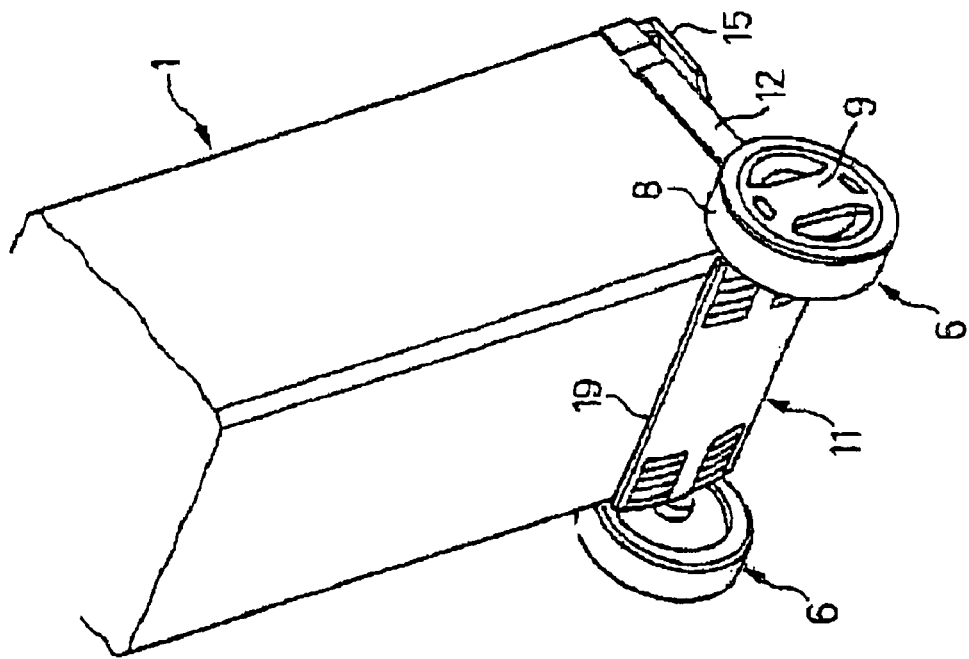
FIG. 3 shows a partial perspective view of the case and the transport device of FIG. 2, slanted in a pulling position.
Figure 2:
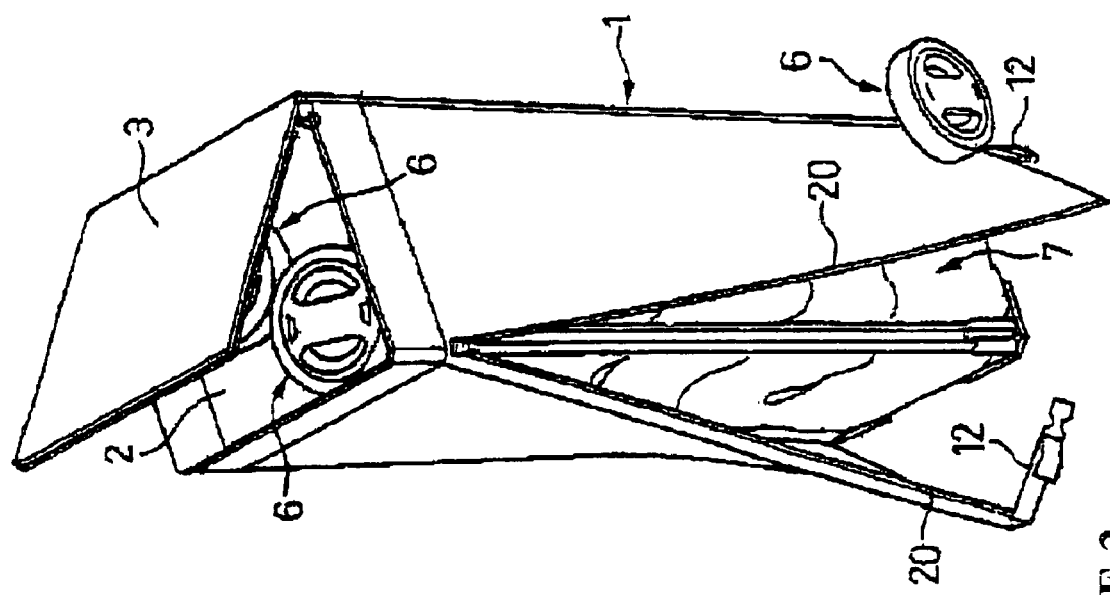
FIG. 2 shows a perspective view of the case and the transport device of the transporter, having an open chamber for wheels, wherein two wheels are provided on the case and the foldable tent is shown inside the case.

FIGS. 1 and 2 show a case 1 of a transporter according to an embodiment of the present invention. The case 1 is provided with an upper chamber 2 for accommodating wheels 6. The chamber 2 may be closed with a cover 3. As shown in FIG. 1, the case 1 is provided with at least one horizontal plate 4. The plate 4, which may be pushed below a foldable tent, serves to transport the tent. A foldable tent 7 is shown enclosed by the case 1 in FIG. 2. FIG. 2 also shows one of the two wheels 6 assembled on a transport device 5 (shown in FIG. 5). Furthermore, two spare wheels are provided in the chamber 2 at the top of the case 1 . Usually, only two wheels 6 are used to transport a foldable tent 7. In FIG. 3, the case 1 is shown in a slanted position during the transportation of the tent.

A foldable tent 7 general stands on four feet 15. As already mentioned, packing the tent previously required repetitive dislocating and lifting of the tent until it was packed in a case or a pocket. Using the present invention, the dislocating and lifting of the tent becomes unnecessary. The case 1 may be opened longitudinally from its lower side, preferably by way of a zipper 20. In this opened position, the case 1 may be easily positioned around the tent 7. After covering the tent 7 with the case 1, the at least one horizontal plate 4 is pushed below the tent 7, and the zipper 20 and a strip 12, provided around the outside of the case 1, are then closed. The wheels 6, with a few hand-manipulations, are assembled onto the transport device 5. The tent 7, without having to be dislocated or lifted, is then ready and packed for transport. As shown in FIG. 1, the case 1 is provided with a hand-grip 21 for grasping, so that the transporter may be tilted into a slanted position and pulled away in a manner similar to pulling a suitcase equipped with wheels.

Figure 4:
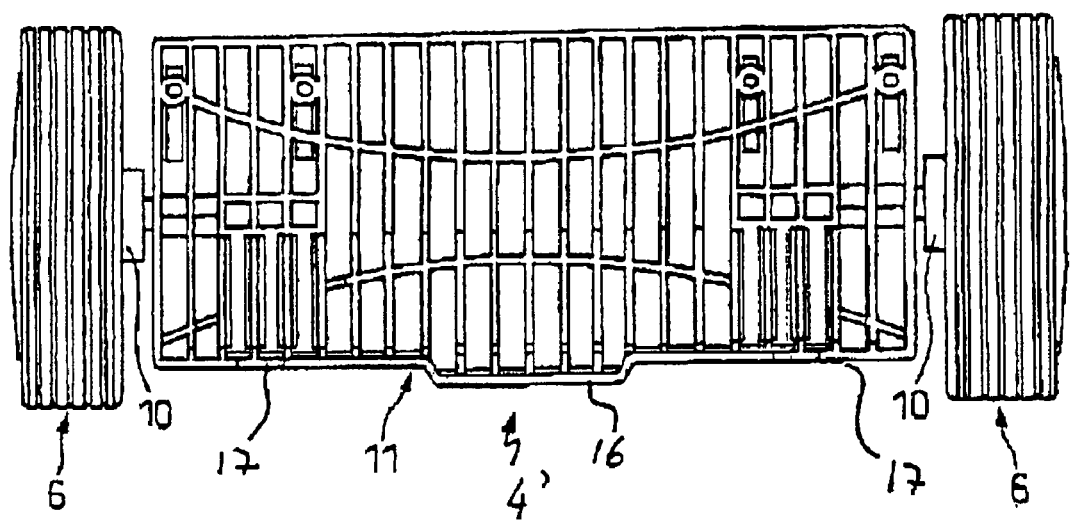
FIG. 4 shows a front view of the transport device of the present invention.

As shown in FIG. 3, the wheels 6 preferably comprise an outer ring 8 and a grip part 9. As shown in FIG. 4, the wheel 6 may be screwed into a hub 10. During pulling or pushing of the transport device 5, the grip part 9 is fixed while the ring 8 of the wheel 6 rotates.

Figure 8:
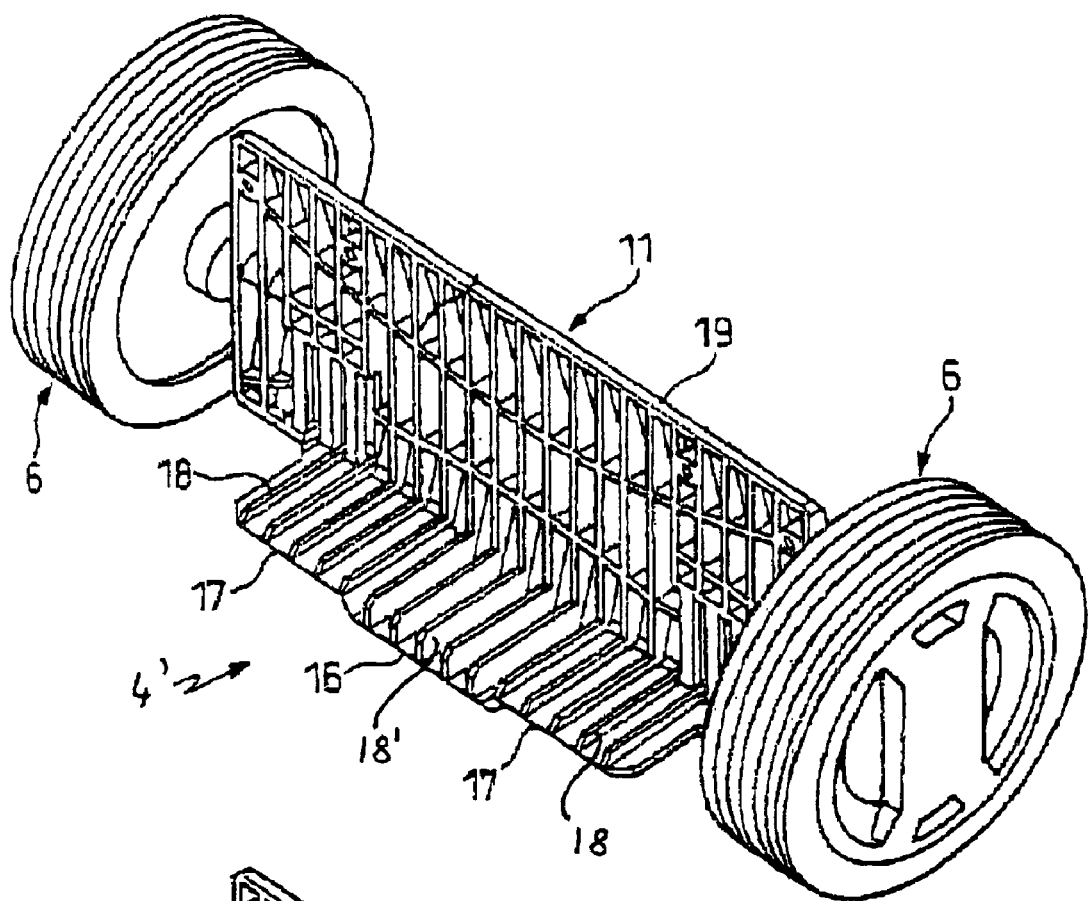
FIG. 8 shows a perspective view of the transport device of FIG. 5, without parts of the tent rod assembly.
Figure 9:
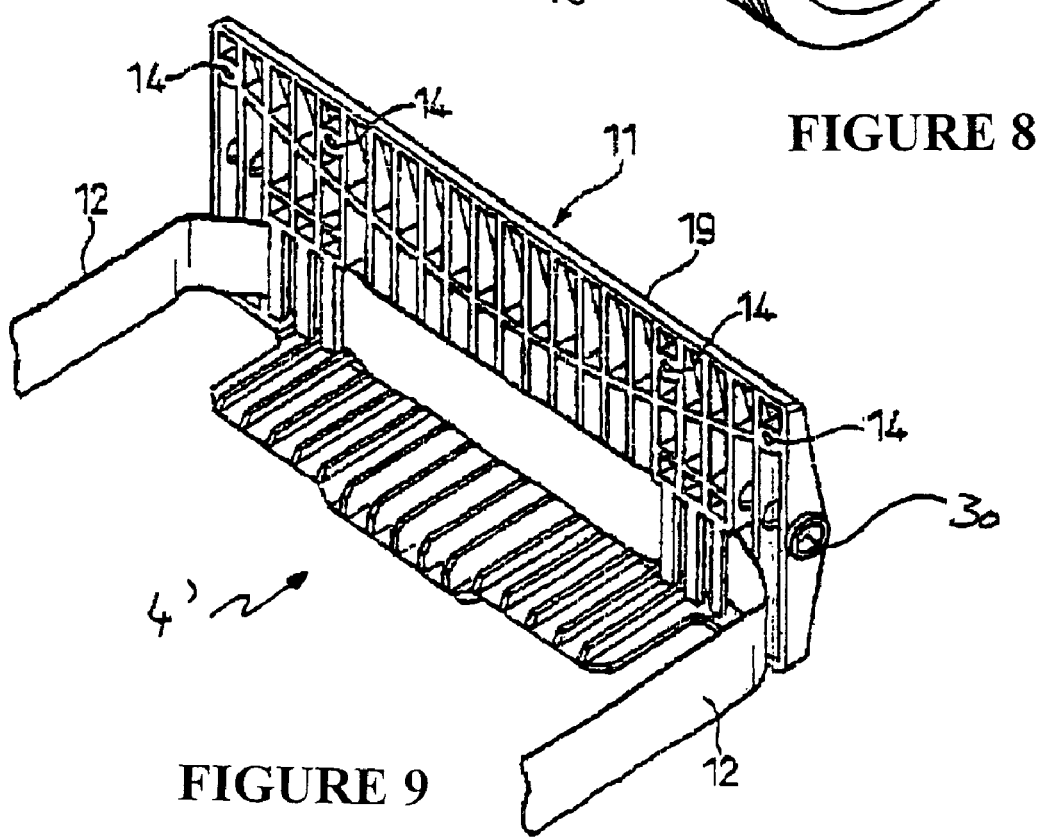
FIG. 9 shows a perspective view of the transport device of FIG. 8, without wheels.

As shown in FIGS. 8 and 9, the transport device 5 comprises an L-profile 11. The strip 12 acts as a fastening means, and may be pulled tight around or fastened around the foldable tent 7 near the lower region of the case 1. The tent 7 and the transport device 5 are thereby held rigidly together during transport. The case 1 is provided with a plurality of holes 13, which are aligned with holes 14 provided on the L-profile 11. Holes 13 and holes 14 may be releasably connected with screws or similar fastening means to prevent a mutual displacement of case 1 and the transport device 5.

In another embodiment of the present invention not shown in the figures, the transport device is fastened on case 1 by way of VELCRO elements, gluing or welding. It is essential to the present invention that the rod assembly of the tent to be transported is used to combine a case 1, which is not reinforced by any further means, and transport device 5 fastened thereto to provide a stable, easily transportable unit. The L-profile 11 is pushed below the folded-up tent, similar to the way a sack trolley may slide under an article, and may be held in position by way of the strip 12 on the folded-up tent. During transport of the tent, the horizontal plate 4 prevents the tent 7 positioned inside the case 1 from sliding down and out of the case 1. When case 1, containing the tent 7, is tilted and pulled at the hand-grip 21, the weight of the tent 7 is directed downwards against the horizontal plate 4. Tilting-away of the horizontal plate 4 is prevented by a vertical plate 19 provided on the L-profile 11, as shown in FIGS. 8 and 9. The vertical plate 19 is fastened on the tent rod assembly by way of the strip 12 and as a result, the horizontal plate 4 is secured against tilting. The tent rod assembly serves as a counter bearing for the vertical plate 19 and the strip 12 as a fastening means, which holds the vertical plate 19 on the rod assembly.

Figure 5:
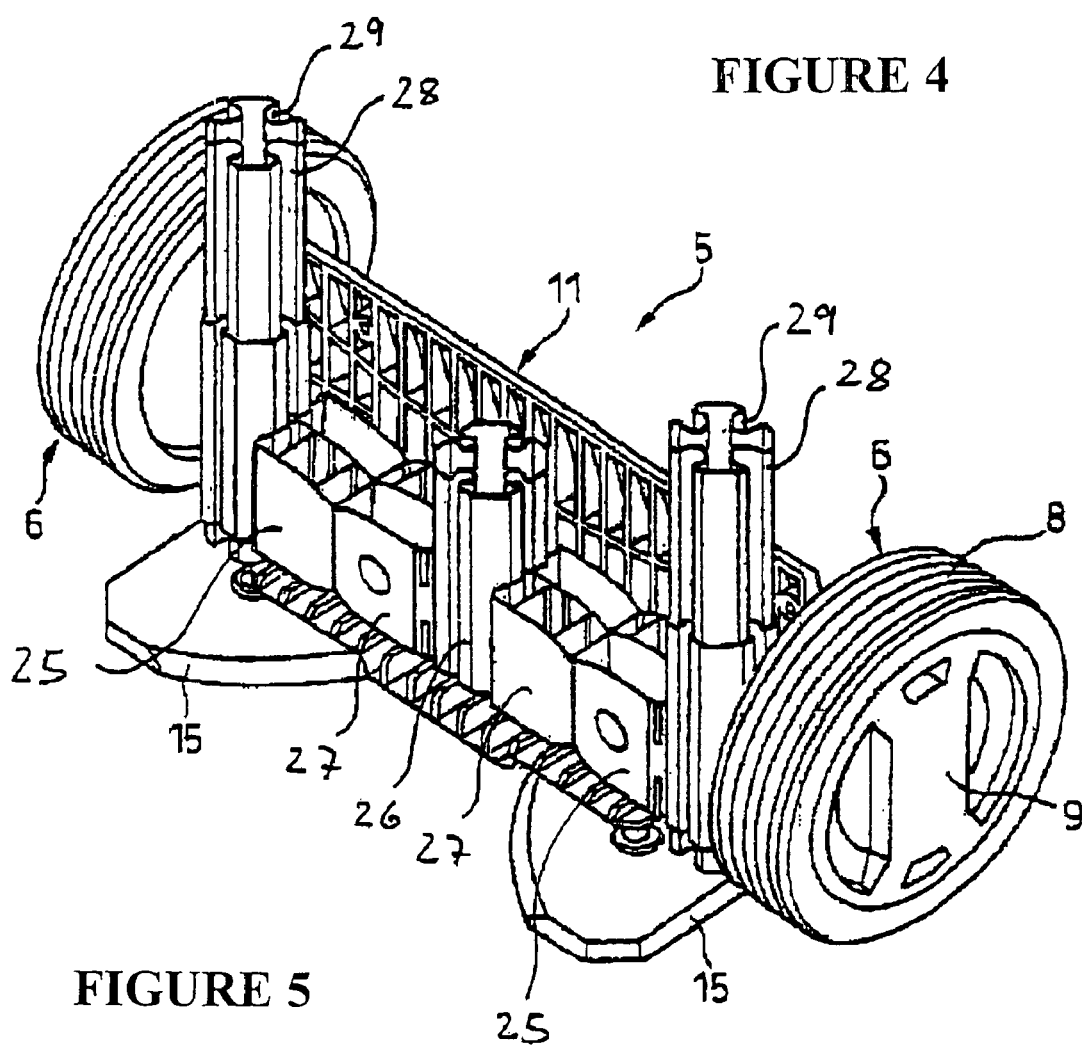
FIG. 5 shows a perspective view of the transport device of FIG. 4, with parts of a tent rod assembly.

In further embodiments, the fastening means may, for example, comprise clamping elements. The clamping elements are preferably arranged on the vertical plate 19, as shown in FIG. 5, in such a manner that they may be introduced onto longitudinal grooves 29 of corner posts 28 and rigidly clamped thereon. If at least the two corner posts 28 are held on the transport device 5 in this manner, then the strip 12 is not necessary. If the lower region of case 1 and the closure means, for example, zipper 20, are manufactured in a narrow and stable manner, then the case 1 and the zipper 2 may serve as a fastening means and the strip 12 may not be necessary. The fastening means must ensure that the foldable tent 7 is held on the transport device 5 so that the tent may not slide off the horizontal plate 4.

Figure 7:
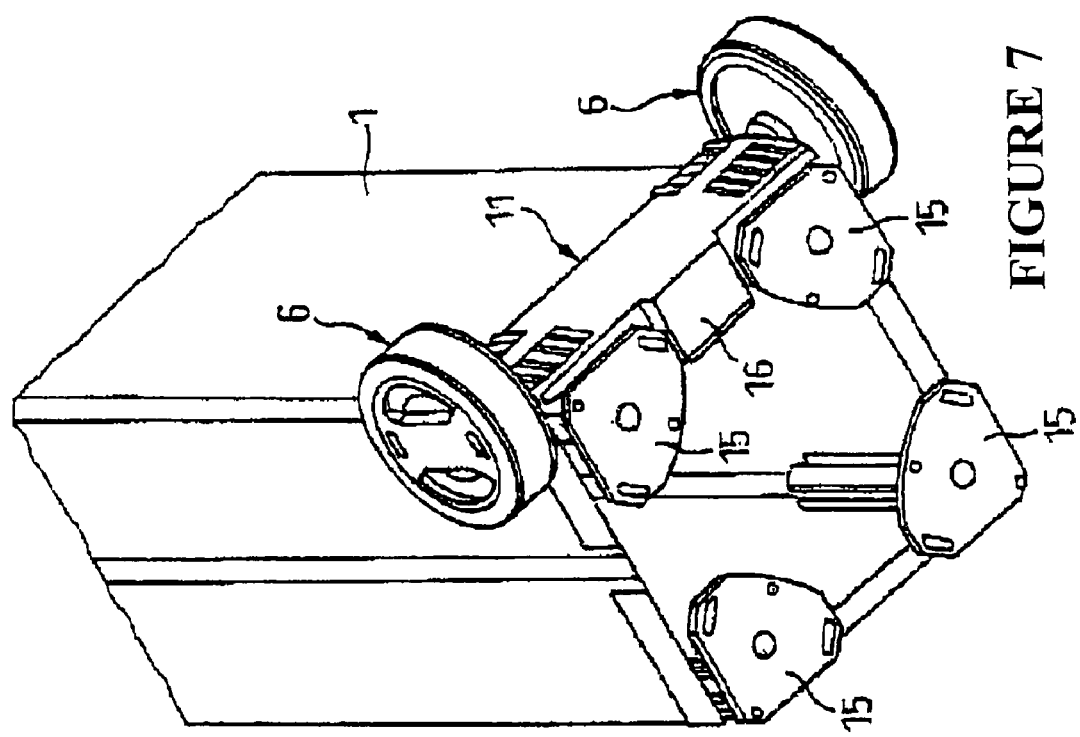
FIG. 7 shows a partial bottom perspective view of the case and the transport device of FIG. 4.

As shown in FIG. 7, the foldable tent 7 is provided with feet 15. The L-profile 11 of the transport device 5 has a further advantageous design. As shown in FIG. 4, the horizontal plate 4' may be easily displaced upwards in two lateral regions 17. A central region 16 lies lower and extends almost to the floor. It can be seen from FIG. 5 that this horizontal plate 4' may be pushed under a rod assembly of the folded-up tent so that one no longer engages below the feet 15, but rather, behind profile slides 25, connection elements 27 and joint elements 26. The horizontal plate no longer extends over the whole width of the transport device, but leaves space for the corner posts 28 of the tent rod assembly.

Horizontal plates 4, 4' generally only partly engage below the tent. Proceeding from the vertical plate 19, the horizontal plates 4, 4' extend at least so far below the tent that one engages below the corner posts 28 and/or the parts of the tent rod assembly 25, 26, 27 located at one side of the tent.

As shown in FIG. 8, the L-profile 11, which is preferably formed of injected plastic, is provided with a plurality of ribs or reinforcements which serve to increase the strength of the L-profile or angle profile 11 with a low weight. A plurality of reinforcement ribs 18, provided on the horizontal plate 4', stand vertically and are higher in the central region 16 than at the side regions 17. As a whole, the ribs 18, the central region 16, and the side regions 17 define a functional unified upper horizontal rest surface.

In the embodiment shown in FIGS. 8 and 9, the wheels 6 are dimensioned and positioned on the transport device so that in the assembled condition with a packed and vertically standing tent, the wheels 6 do not make contact with the ground. A receiving opening 30 for the wheel axle is thus positioned at a distance from the ground that measures more than the wheel's radius. This arrangement allows easily assembly and disassembly of the wheels without having to lift the tent or tilt it at its lower side. This helps to avoid the danger of the tent falling over during the assembly of the wheels. When the packed tent is gripped at the hand-grip 21 of case 1 and tilted for transport, the wheels 6 come into contact with the ground and a pushing or pulling motion is made possible.

Figure 6:
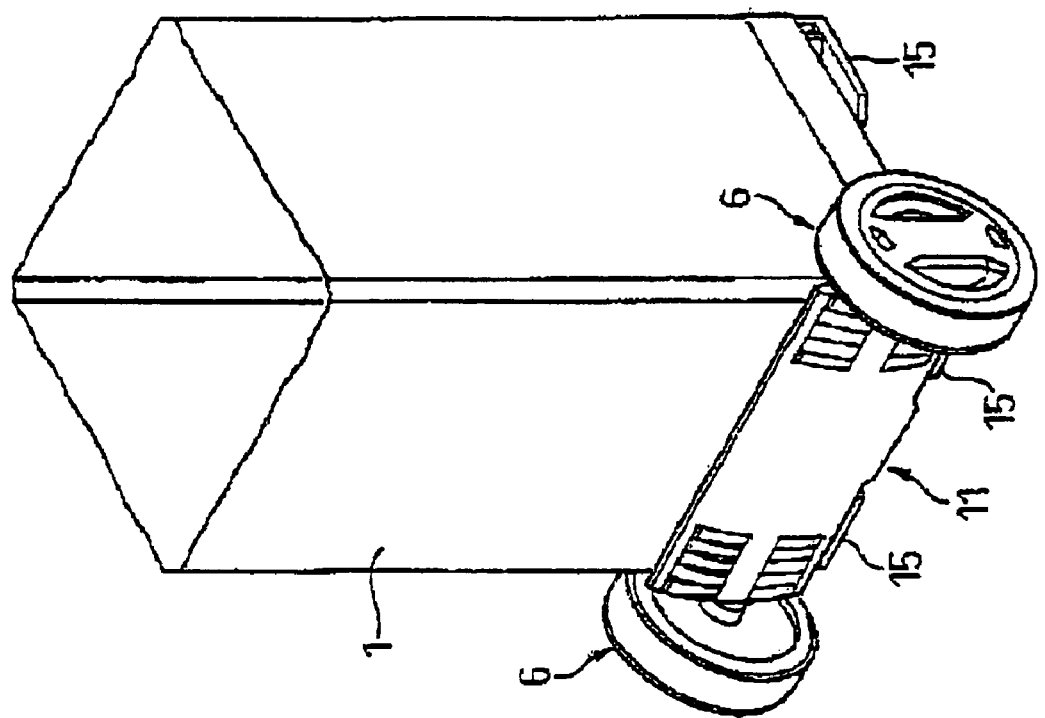
FIG. 6 shows a partial perspective view of the case and the transport device of FIG. 4.

To attach the case 1 to the transport device 5, the tent 7 is first folded up and covered by the case 1, wherein section 16 of the L-profile 11 comes to lie below the tent 7, between two feet 15. The vertically extending profile wall 19, which is already connected to the case 1, prevents the case 1 from being displaced upwards (FIGS. 6 and 7). The zipper 20 is then pulled downwards and the strip 12 is wrapped around the case 1 and pulled tight. Finally, the chamber 2 is closed at the top and the tent 7 is ready to be transported. A zipper or a VELCRO strip may be provided for closing the chamber 2.

When the tent 7 is stored and not in use, the wheels 6 may be assembled or may be stored in the upper chamber 2. The storage in the upper chamber 2 has the advantage of keeping the wheels clean, which has an advantageous effect on the pulling or pushing motion.

The transporter of the present invention allows a single person to erect the tent, which may not be possible if the tent is stored in a carrying bag. Not only may the assembly and erection of the tent be accomplished by a single person, but the folding-up and packing of the tent also may be accomplished by a single person with the use of the case and the transport device.

Near the very top of the case 1, hand-grips 21 are provided on opposite sides of the case 1, which serve for transporting the tent 7 in a slanted position.

Usually, two wheels are provided for each foldable tent. With larger tents, it may be useful to use four wheels instead of two. In such an embodiment, the transport device comprises two L-profiles, which are preferably arranged on opposite sides of the tent. This embodiment of the transporter is preferably moved in the vertical position. Thus, the transporter is in a standing position instead of a slanted position. The size and the position of the wheels in this embodiment are selected so that the receiving opening 30 for the wheel axles on the transport device 5, in the assembled condition, is positioned at a distance from the ground, which is less than the wheel's radius. Thus the transport device as a whole lifts the tent in the packed condition slightly away from the ground. In order to assemble the wheels, the upright-standing tent near the lower edge in each case is completely lifted and tilted.

The case 1 is easy to assemble onto the tent 7 because it is formed similar to a coat or a cap, which is simply thrown onto the tent or is laid around the tent. Thus, attaching the case to the tent does not require the tent to be turned by 180° during attaching or removing, which would be the case with a carrying bag.

I claim:

1. A transporter with a foldable tent comprising:
   (a) a case comprising four side walls, a closed upper end, and an open lower end;
   wherein the case is not reinforced, and wherein the case can be opened and closed along one longitudinal side;
   (b) a foldable tent packed and stored within the case; wherein the foldable tent is completely enclosed by the case when the case is closed;
   (c) a transport device arranged at the open lower end of the case, the transport device comprising a horizontal plate which engages with and supports the foldable tent; and a vertical plate connected to the horizontal plate and the case;
   (d) a strap connected to the vertical plate and releasably spanning the case along its perimeter at the open lower open end, thereby firmly pressing the foldable tent to the vertical plate; and
   (e) two wheels connected at two opposite ends of the vertical plate, wherein the common rotation axis of the two wheels rotates outside of the case and above the horizontal plate, and wherein the two wheels do not make contact with the ground when the transporter is in an upright position.

2. The transporter of claim 1, wherein, the two wheels are releasably connected to the vertical plate via a hub, and comprises a ring which rotates over the hub.

3. The transporter of claim 1, wherein the case may be opened and closed along one longitudinal side by way of a zipper.

4. The transporter of claim 1, wherein the case may be opened and closed along one longitudinal side by way of a hook and loop fastener.

5. The transporter of claim 1, wherein the case is provided with at least one hand-grip near the upper end, wherein the at least one hand grip is directly connected to the case.

6. The transporter of claim 1, wherein when not in use, the wheels are stored in a chamber on top of the closed end of the case, the chamber being provided with a cover.

7. The transporter of claim 1, wherein the transporter comprises two transport devices arranged at two opposite ends of the case, wherein each transport device is connected the case, and wherein the strap is connected to both transport devices.

* * * * *